Patented Feb. 17, 1931

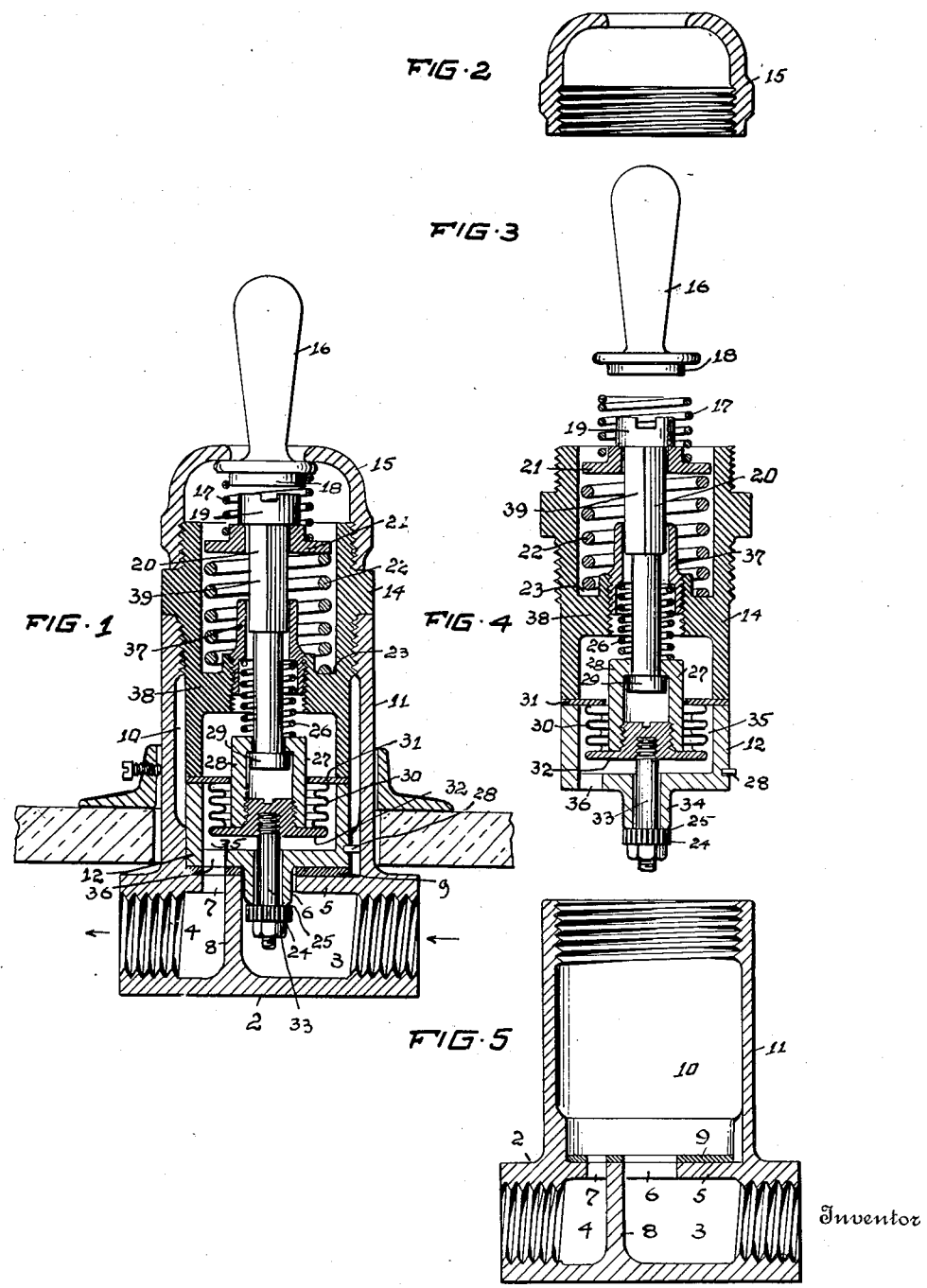

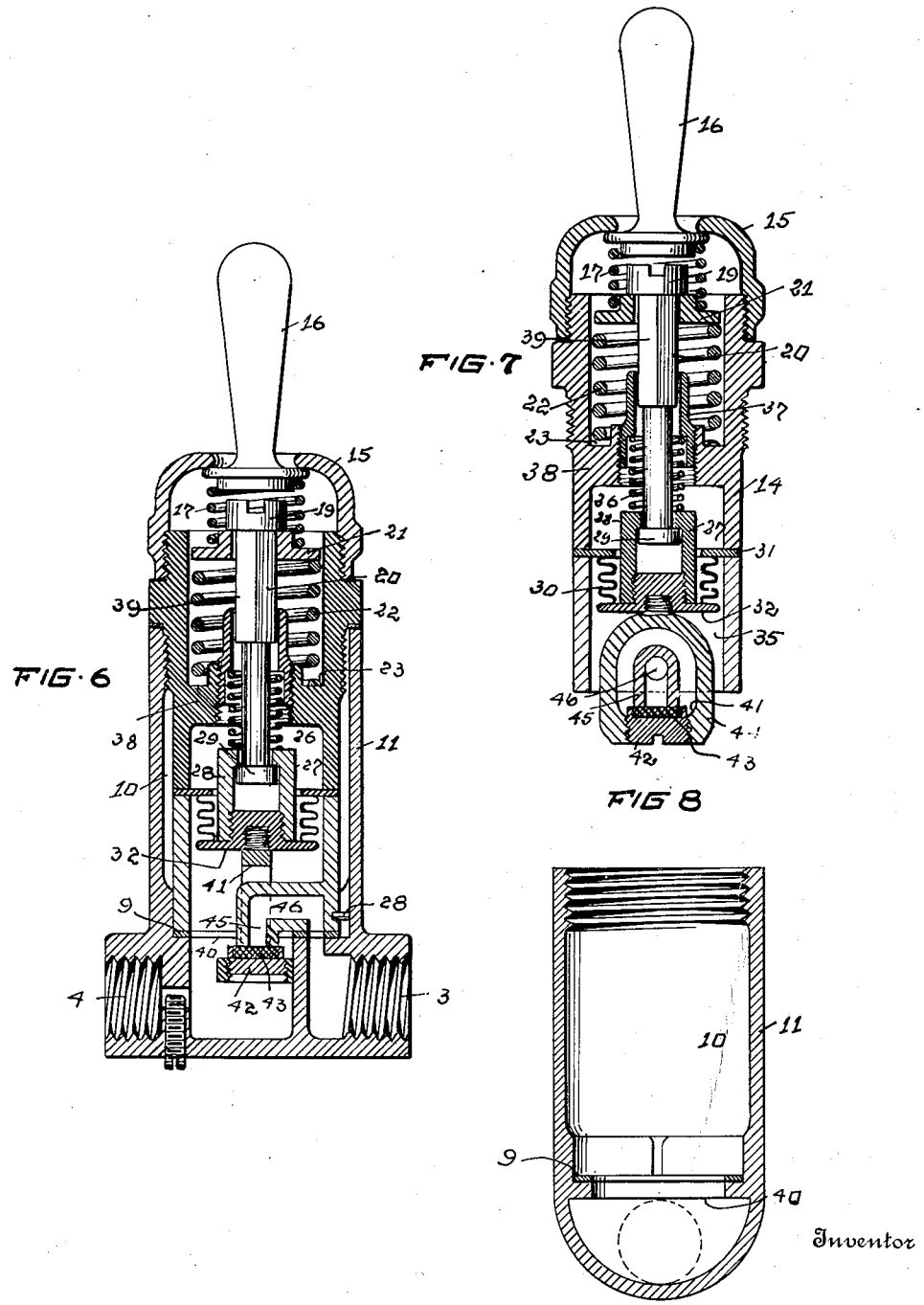

1,793,292

UNITED STATES PATENT OFFICE

HALSEY W. TAYLOR, OF WARREN, OHIO

PRESSURE-REGULATING VALVE

Application filed August 1, 1928. Serial No. 296,745.

My invention relates to an improvement in pressure-regulating valves, and in general the object of the invention is to provide a self-closing valve for drinking fountains, which when opened, will automatically regulate the pressure of the water passing through the valve. Thus, in discharging a stream of water under pressure from a drinking fountain it is desirable to maintain a substantially uniform pressure at the delivery nozzle regardless of variations in the line pressure. This is difficult where the delivery of water from the fountain is intermittent and subject to instant release by a user. An automatic pressure regulator or reducing valve is therefore usually employed in the line, together with a separate manually-controllable shut-off valve at the fountain. The present invention combines a self-closing valve with a pressure regulator, and the working parts thereof are removable and replaceable as a unit in the valve body. Normally, the valve is closed and the pressure regulator is cut off from the pressure in the line and rendered inactive by the self-closing means for the valve. When the valve is open the pressure regulator is released from all restraint of the self-closing means and free to open and close the water passage in varying degree dependent upon the pressure conditions in the water system. The regulator may also be readily adjusted to meet different demands or requirements, and to avoid unauthorized persons from tampering with the settings the adjusting device is covered and concealed beneath the operating handle and a cap at the top of the device.

In the accompanying drawings, Fig. 1 is a sectional view of a self-closing valve embodying the invention; Fig. 2 a sectional view of the detachable cap; Fig. 3 a side elevation of the handle; Fig. 4 a sectional view of the main working assembly or unit; and Fig. 5 a sectional view of the valve body. Figs. 6, 7, and 8 are sectional views of a modified form of the invention.

The valve comprises a chambered body 2 having separate inlet and outlet passages 3 and 4 respectively, in its base portion, the interior of which is divided by a flat cross wall 5 having two openings 6 and 7, therein on opposite sides of a vertical division wall 8. A sealing washer 9 having openings therein corresponding to openings 6 and 7 is seated upon cross wall 5 at the bottom of a relatively deep well or chamber 10 within the cylindrical upper part 11 of body 2. Washer 9 is engaged and compressed by a separate extension or end member 12 of a removable screw plug 14 when the latter is introduced into chamber 10. A screw cap 15 mounted upon plug 14 holds a tilting handle 16 centrally upon a coiled compression spring 17. Handle 16 has an annular enlargement 18 at its bottom opposite the head 19 of a depressible stem 20 which extends downwardly through a loose washer 21 and a coiled spring 22 bearing upwardly against the washer. Spring 22 is a strong compression spring seated within a recess 23 in the upper part of plug 14, and its primary function is to hold a pressure-regulating valve member 24 normally in a closed position against a main valve seat 25. Tilting of handle 16 merely releases valve member 24 so that it may be operated automatically by a weaker spring 26 acting counter to a movable device 27 exposed to the pressure in the line. Thus when handle 16 is released and stands upright the main spring 22 seats valve member 24 with positive closing effect despite the opposition of weaker spring 26, and when handle 16 is tilted the pull of the stronger spring 22 on valve member 24 is entirely overcome to permit the weaker spring 26 and the pressure device 27 to co-act in regulating the pressure at the delivery side of the valve. Accordingly, valve member 24 is yoked or loosely connected to depressible stem 20 to permit these parts to reciprocate independently. As shown, the connection comprises a coupling member 28 having swiveled or rotatable union with an enlargement or collar 29 on the lower end of depressible stem 20, including a collapsible bellows 30 which is secured to a flat ring or plate 31 and which is further provided with a pressure disk or head 32 in screw-connection with coupling member 28. A screw-threaded bolt or valve stem 33 is attached to head 32, and valve member 24 is secured to the lower end of this stem opposite valve seat 25 at the lower end of a nipple 34 on the end piece 12 of plug 14. Nipple 34 has a central water passage communicating with inlet 3 and a pressure chamber 35 containing collapsible bellows 30. An opening 36 in the bottom of end piece 12 leads to opening 7 and outlet passage 4 in body 2, which it should be understood is usually connected to a delivery jet or nozzle by pipes wherein a back pressure is generally created due to the use of manually adjustable restricting means or a restricted outlet of fixed dimensions. The restriction placed on the passage of the water does not, however, prevent variation in flow and undesirable changes in the drinking stream due to variation in the line pressure, especially when the water is turned on suddenly. The present device is designed to compensate for such variation in line pressure automatically and instantly when the water is turned on by tilting handle 16 and depressing stem 20. In that action the strong main spring 22 is compressed to permit valve member 24 to be opened by the relatively weaker spring 26 which is interposed between coupling member 28 and an adjustable nut or thimble 37 in screw-connection with the central diaphragm or wall 38 in plug 14. Depressible stem 20 has a square or flattened portion 39 passing through an opening of corresponding shape in the nut or thimble 37, thereby providing an interconnection which permits the stem to be reciprocated and also rotated, the latter movement being utilized to turn the nut to change the tension of spring 22. Thus when cap 15 and handle 16 are removed the slotted head 19 of stem 20 is exposed and may be rotated by hand or a tool, thereby adjusting the tension of spring 26 to oppose in greater or lesser degree the pressure of the fluid against disk 32 when the valve is open. In that way any desired outlet pressure may be established and should the pressure beneath disk 32 increase sufficiently to move the disk upwardly the valve member 24 will move closer to the valve seat and restrict the water passage until an equilibrium and the same outlet pressure is obtained. Furthermore, if the pressure of the fluid against disk 32 drops and disturbs the normal balance between spring 26 and the pressure device this spring (26) will set to open valve member 24 additionally to restore an equalizing pressure in the delivery side of the valve.

In installing a valve of this kind in a drinking fountain cabinet or other place the body of the valve is permanently connected to the pipes and may be in part covered and inaccessible. Therefore, to promote inspection, cleansing and servicing, the operating parts of the valve are all mounted within or upon plug 14 and removable as a unit from the valve body. Thus by simply unscrewing plug 14 all the working parts of the valve may be removed intact without disturbing their working relations. However, the cylindrical end piece 12 and the collapsible pressure device are separate detachable parts of this unit to facilitate assembly, replacements, and repairs. Coupling member 28 also provides a swiveled or rotatable connection between the screw plug and the pressure regulator, thereby permitting plug 14 to be rotated in screw-connection with the cylindrical extension 11 of body 2 while end piece 12 is being pressed tightly upon the gasket or sealing washer 9. To prevent independent rotation of end piece 12 the internal wall of extension 11 may be provided with a slot to receive a pin or key 28 on end piece 12, and this pin serves also to bring the openings in its bottom in register with the openings in cross wall 5 of the body 2.

In Figs. 6 to 8, I show a modified form of the invention, in which like parts in both devices are designated by the same reference characters. The modifications reside mainly in the valve member and its seat. Thus, body 2 has a wider opening 40 in its top to receive a yoke 41 which is suspended from pressure disk 32. A screw plug 42 having an insert piece 43 is adjustably secured within the bottom of yoke 41 opposite a horizontal valve seat 44 at the end of a lateral projection or nipple 45 within end piece 12. Nipple 45 contains a duct or passage 46 extending from the valve seat to the inlet passage 3 in body 2. Otherwise the construction and operation of this valve is the same as the one hereinbefore described.

What I claim is:

1. A pressure regulating valve, comprising a body having a fluid passage and valve seat, including a spring-operated self-closing valve member for said seat, manually-operable means for unseating said valve member including a spring counteracting the spring of said valve member, and means operable by the pressure of the fluid for shifting the position of said valve member relatively to its seat independently from said counteracting spring when said manually operated means have been actuated to unseat said valve member.

2. A pressure regulating valve, comprising a valve body containing intake and outlet passages and a valve seat, including a movable valve member for said valve seat, means to actuate said valve member, a pressure device situated in the outlet passage for automatically controlling the movements of said valve member independently from said means, said actuating means of said valve member including means for holding said valve member upon its seat and the pressure device normally inactive.

3. A pressure regulating valve, including a chambered body, a removable closure member for said body, a pressure regulating device and valve for controlling the passage of a fluid through said body including an independent spring member actuating said valve, a spring acting normally to hold said valve closed, and a handle to render said latter spring inactive and permit said pressure regulating device to operate.

4. A pressure regulating valve, comprising a chambered body, a main valve controlling the passage of fluid through said body, a pressure device exposed to the fluid on the pressure side and connected to said valve, a spring rigidly supported in said body acting counter to said pressure device, means for adjusting the tension of said spring, and manually-operable spring means counteracting said first spring for holding said first mentioned spring and pressure device normally inactive.

5. A pressure regulating valve, including a chambered body, a main valve, a pressure-operated member connected to said valve, a reciprocable stem slidably connected with said member, a set of springs of different power upon said stem acting counter to each other, and a manually controllable device for rendering one of said springs inactive.

6. A pressure regulating valve, including a chambered body, a closure member for said body, a valve element and a pressure regulating device supporting said valve element and connected to one end of said closure member, means mounted upon said closure member to actuate said valve element and regulating device, spring actuated means holding said pressure-regulating device positively inactive, and manually-operable means for releasing said holding means.

7. A pressure regulating valve, including a chambered body, a screw plug for said body, an end piece for said plug having a valve seat, a valve movably situated opposite said seat, a fluid-operated pressure device and a spring mounted in said plug and counteracting said pressure device to control the movement of said valve, means including a spring, to hold said pressure device inactive and said valve seated, and means for releasing said holding means.

8. A pressure regulating valve, including a chambered body, a closure member for said body having a separate end piece, a collapsible pressure device clamped between said closure member and end piece, a valve connected with said device and a spring seated within said closure member and actuating said device independently from said collapsible pressure device, a reciprocable operating stem and spring to positively hold said device inactive, and manually-operable means for depressing said stem.

9. A pressure regulating valve, including a body having a chamber and inlet and outlet passages, a closure member for said chamber, a collapsible bellows and a movable valve secured within said chamber by said closure member, a counteracting spring for said bellows seated within said closure member, tension adjusting means for said spring, a reciprocable stem connected to said bellows and rotatably coupled with said adjusting means, a spring to raise said stem, and means for depressing said stem, said last spring counteracting said first spring for said collapsible bellows.

10. A pressure regulating valve, comprising a chambered body, having an inlet and an outlet, a screw-threaded plug connected with said body, an end piece for said plug having a valve seat, a movable valve for said seat, a collapsible bellows confined between said plug and end piece coupled to said valve, a depressible stem rotatably connected to said bellows, a spring seated within said plug in lift connection with said stem, a second spring seated within said plug and operably connected with said valve member, a cap for said plug, and means protruding through said cap for depressing said stem.

11. A pressure regulating valve, including a chambered body having separate intake and outlet passages, a valve member, manual means to operate said valve member, means operable by fluid pressure to control said valve member independently of said manual means, and a detachable closure for said chambered body upon which said valve member, said fluid pressure controlled means and said manual means are supported for joint removal from said chambered body, said manual means for said valve member holding said fluid pressure controlled means normally inactive.

In testimony whereof I affix my signature.
HALSEY W. TAYLOR.